(12) United States Patent
Mayer et al.

(10) Patent No.: US 9,410,640 B2
(45) Date of Patent: Aug. 9, 2016

(54) VALVE OF A STORAGE DEVICE HAVING A SPRING ELEMENT

(71) Applicant: Robert Bosch GmbH, Stuttgart (DE)

(72) Inventors: Franz Mayer, Haldenwang (DE); Klaus-Peter Schmoll, Lehrensteinsfeld (DE); Dietmar Kratzer, Tamm (DE); Edgar Kurz, Heilbronn-Horkheim (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 14/049,612

(22) Filed: Oct. 9, 2013

(65) Prior Publication Data

US 2014/0102089 A1    Apr. 17, 2014

(30) Foreign Application Priority Data

Oct. 11, 2012 (DE) .......................... 10 2012 218 553

(51) Int. Cl.
| | |
|---|---|
| F15B 1/02 | (2006.01) |
| F16K 31/60 | (2006.01) |
| F15B 1/027 | (2006.01) |
| B60T 8/42 | (2006.01) |
| F16K 15/18 | (2006.01) |
| B60T 8/36 | (2006.01) |
| F15B 1/22 | (2006.01) |
| B60T 8/48 | (2006.01) |

(52) U.S. Cl.
CPC ............... *F16K 31/602* (2013.01); *B60T 8/368* (2013.01); *B60T 8/42* (2013.01); *F15B 1/027* (2013.01); *F15B 1/22* (2013.01); *F16K 15/183* (2013.01); *B60T 8/4275* (2013.01); *B60T 8/4872* (2013.01); *F15B 2201/21* (2013.01); *F15B 2201/31* (2013.01); *F15B 2201/411* (2013.01)

(58) Field of Classification Search
CPC ........... F15B 2201/21; F15B 2201/411; F15B 15/103; F16L 55/045; F16L 55/05; F16L 55/055; F16K 31/1221; F16K 15/183; B21D 53/10; B60T 8/368; F16J 3/06
USPC ................................... 137/522, 539; 251/239
See application file for complete search history.

(56) References Cited

U.S. PATENT DOCUMENTS

| | | | | |
|---|---|---|---|---|
| 5,232,273 | A * | 8/1993 | Eckstein et al. ........... 303/116.4 |
| 5,333,945 | A * | 8/1994 | Volz et al. .................. 303/119.2 |
| 5,590,936 | A * | 1/1997 | Reuter ....................... 303/116.1 |
| 5,672,053 | A * | 9/1997 | Sabha .......................... 417/569 |
| 5,794,656 | A * | 8/1998 | Breslin .................... 137/533.11 |
| 7,913,503 | B2 * | 3/2011 | Lu et al. ......................... 62/222 |
| 2008/0017255 | A1 * | 1/2008 | Petersen ....................... 137/522 |
| 2008/0029165 | A1 * | 2/2008 | Beck ............................ 137/539 |
| 2009/0014072 | A1 * | 1/2009 | Zhang ........................... 137/522 |

(Continued)

FOREIGN PATENT DOCUMENTS

| | | |
|---|---|---|
| DE | 10 2009 028 912 A1 | 3/2010 |
| DE | 10 2010 038 338 A1 | 9/2011 |
| DE | 10 2011 087 816 A1 | 6/2012 |

*Primary Examiner* — Nathaniel Wiehe
*Assistant Examiner* — Abiy Teka
(74) *Attorney, Agent, or Firm* — Maginot, Moore & Beck LLP

(57) ABSTRACT

A valve of an accumulator device, which is formed by an accumulator cylinder and an accumulator piston guided therein, includes a valve sealing body. The valve sealing body is configured to selectively open and close a valve opening at a valve seat. The valve also includes an opening mechanism configured to selectively raise the valve sealing body from the valve seat. The opening mechanism is held by a spring element, and the spring element is formed by a punched and bent part.

17 Claims, 10 Drawing Sheets

(56) References Cited

U.S. PATENT DOCUMENTS

| | | | |
|---|---|---|---|
| 2010/0052417 A1* | 3/2010 | Aoba | B60T 8/368 303/115.4 |
| 2010/0200095 A1* | 8/2010 | Yokota et al. | 137/857 |
| 2010/0327652 A1* | 12/2010 | Koyama | 303/1 |
| 2012/0139332 A1* | 6/2012 | Terashima | B60T 8/368 303/115.1 |

* cited by examiner

VALVE OF A STORAGE DEVICE HAVING A SPRING ELEMENT

This application claims priority under 35 U.S.C. §119 to patent application no. 10 2012 218 553.4, filed on Oct. 11, 2012 in Germany, the disclosure of which is incorporated herein by reference in its entirety.

BACKGROUND

The disclosure relates to a valve of an accumulator device, which is formed by means of an accumulator cylinder and an accumulator piston guided therein. The valve comprises a valve sealing body for selective opening and closure of a valve opening at a valve seat and having an opening means for selectively raising the valve sealing body from the valve seat, which opening means is held by means of a spring element. The disclosure furthermore relates to the use of a valve of this kind in an accumulator device, in particular for a hydraulic unit of a vehicle brake system.

Accumulator devices of the type in question are used particularly in vehicle brake systems and serve to provide temporary storage for pressure medium in the form of brake fluid. In this case, the pressure medium is returned from wheel brake cylinders or fed in from a main accumulator of the vehicle brake system, e.g. in vehicle brake systems with an antilock brake system (ABS) and an electronic stability program (ESP).

Valves in accumulator devices of hydraulic units, in particular of vehicle brake systems, are used to control the quantity of pressure medium within the associated accumulator device.

The accumulator devices comprise an accumulator cylinder and an accumulator piston which is guided therein and by means of which an accumulator volume for the pressure medium is delimited. The pressure medium can be delivered from the accumulator volume into a brake circuit when required. If the accumulator volume decreases, the accumulator piston travels into the accumulator cylinder to a depth such that, by means of an opening means, it opens a valve closed in a spring-assisted manner. Pressure medium then flows into the accumulator cylinder again through the opened valve.

Conventionally employed opening means are configured as a pin which is inserted, in particular press-fitted, in an accurately fitting manner at a fixed location in the accumulator piston. Manufacture with an accurate fit is necessary since the opening means must strike the valve sealing body correctly in order to raise it. In general, the pin-shaped opening means is passed through the valve opening to the valve sealing body from the piston side. For this purpose, high precision in the component geometry and in the stroke motion of the accumulator piston is necessary. Precise component geometry can be achieved only by very dimensionally accurate and hence expensive components, manufacture and assembly. A precise stroke motion entails a complex configuration with, for example, additional guide rings and a long length of guidance for the accumulator piston.

SUMMARY

According to the disclosure, a valve is provided for an accumulator device formed by means of an accumulator cylinder and an accumulator piston guided therein. The valve is provided with a valve sealing body for selective opening and closure of a valve opening at a valve seat. The valve furthermore has an opening means for selectively raising the valve sealing body from the valve seat, in which the opening means is held by means of a spring element. The spring element is formed by means of a punched and bent part.

The spring element according to the disclosure is deformed by virtue of its spring properties when a force is exerted, and reassumes its original shape when the force acting upon it ceases. Here, the spring element holds the opening means accurately and robustly in position on the valve sealing body. At the same time, it also gives the opening means a defined freedom of movement so that, when the piston moves, it is taken along by the latter and pushed against the valve closing body. When moved in this way, the opening means raises the valve sealing body from the valve seat by pressure contact and opens the valve.

According to the disclosure, the spring element is formed by means of a punched and bent part, which can be produced in a particularly simple and economical manner and in large quantities by machine by punching and bending a suitable material. A suitable material which is preferably used is a metal sheet, in particular spring steel, which is very robust and exhibits little wear. Moreover, functional elements or functional regions that are required during production in and/ or on the spring element can be integrated into the punched and bent part in a particularly simple and economical manner, preferably in a single step by means of punching and/or bending.

For assembly, the opening means with the associated punched and bent part can preferably simply be inserted and clipped into or clipped onto the accumulator device.

Moreover, as a relatively small precision component, the punched and bent part together with the opening means can be produced at low cost. The opening means with the punched and bent part is furthermore preferably configured as an individual component, which is advantageously produced in advance and is held nonpositively and/or positively on the accumulator device with little effort by means of the spring element as a punched and bent part.

In comparison with conventional accumulator devices, the overall result is lower accuracy requirements on the manufacture of the opening means and the mounting thereof on the accumulator device. Thus, in addition to the low-cost production of the spring element as a punched and bent part, the effort involved in manufacture and manufacturing costs for the accumulator device are reduced overall.

As a particularly preferred option, the opening means is held on the accumulator cylinder or the cylinder by means of the punched and bent part. By being held in this way, the opening means is held on the component at which the valve closing body also rests on its valve seat, at least indirectly. Therefore, the position of these components relative to one another is then particularly precise. The opening means can furthermore be mounted very easily on the cylinder simply by being clipped in.

As an alternative, the opening means is advantageously held on the accumulator piston or the piston by means of the punched and bent part. Here too, simple clip mounting is possible. In this development, it is furthermore possible to use a simple standard accumulator piston without the need for a particularly precise interference fit for an opening means on said piston. A relatively simple piston geometry can therefore be chosen. Moreover, the risk of abraded shavings or of deformation due to compressive forces is almost completely avoided.

Particularly precise positioning of the opening means held in accordance with the disclosure is possible if the associated punched and bent part is arranged directly on the component forming the valve seat, in particular a valve seat body.

Together with the opening means, the punched and bent part of this kind can then also be of particularly small dimensions. Integral configuration of the punched and bent part with the component forming the valve seat is advantageous. It is furthermore also advantageous likewise to make the valve sealing body integral with the opening means and the punched and bent part. Here, it is possible, in particular, to make use of the high strength of spring steel for the valve seat and/or the valve sealing body too. With a "combination part" of this kind, it is also possible to make the surrounding pump housing particularly small.

The opening means is preferably configured with a pin element for engagement, in particular for slightly eccentric engagement, on the valve sealing body. In this case, the pin element is formed by means of a pin which is punched out of a reference plane of the punched and bent part and bent out of said reference plane. A pin of this kind as an opening means can advantageously extend through the valve opening in order then, on the one hand, to engage on the valve sealing body and, on the other hand, to be actuated by the accumulator piston. For this purpose, the end of the pin facing the valve sealing body can be specially adapted, in particular configured with an oblique contact surface, to ensure that the valve sealing body is not deformed at its surface when the opening means makes contact.

That end of the pin which is directed toward the valve sealing body is furthermore preferably configured with at least two points of engagement by means of which the pin engages on the valve sealing body when opening the valve. Using at least two points of engagement stabilizes the direction of motion during engagement and as the valve sealing body is pushed open, especially where the valve sealing body is a ball. For the ball, at least three points of support are formed by two points of engagement together with a point of contact or point of rolling contact on an associated valve seat of a valve seat body, and therefore the position of the ball is fixed in a definite and stable manner.

Moreover, the opening means preferably engages on the valve sealing body with a slight eccentricity, thereby making separation and raising of the valve sealing body from the valve seat easier. The valve sealing body is then raised in a slightly asymmetric manner, as a result of which the flow cross section of the valve opening is increased quickly and more fluid can flow through per unit time.

As an alternative, the pin is manufactured as an individual part and connected to the punched and bent part as a spring element. As a particularly preferred option, the end of the pin facing the punched and bent part has a shoulder formation which can be fitted into a recess of complementary shape on the punched and bent part. The pin is preferably fitted in a particularly stable and non-detachable manner on the punched and bent part, in particular by means of an interference fit. In an alternative variant, the pin is advantageously connected releasably to the punched and bent part, thus enabling the pin to be replaced individually in a simple manner as a wearing part.

It is furthermore advantageous if the pin is held by means of a radially directed arm. As a portion of the punched and bent part, the radially directed arm forms a resilient connection radially from the outside to the inside, wherein the pin is positioned radially on the inside. With this connection, the pin is held in a very simple manner in the center of an otherwise circular-cylindrical cylinder-piston arrangement by means of a spring force defined by the arm. The valve opening can advantageously be arranged there in the center, thereby making it possible to achieve a symmetrical and largely laminar flow through the valve according to the disclosure.

Moreover, the arm is advantageously configured with two subarms, which are punched out of the reference plane of the punched and bent part and extend substantially radially, in particular in parallel. The subarms are spaced apart, thus forming a through opening for the brake fluid. The brake fluid flows through the through opening during operation, thus advantageously enabling brake fluid to be delivered with little resistance. Moreover, the spring force of the individual subarm can be adapted individually according to operating requirements, in particular by varying the thickness and/or length of the individual subarm. It is advantageous if the subarms have a lower spring force overall, in particular because of the through opening, than a single compact arm without a through opening having otherwise identical thickness and length dimensions. By means of the lower spring force, a lower resistance of the spring element to displacement by the accumulator piston is provided.

Moreover, a bead, in particular a concave bead or a convex bead, is preferably formed at the transition from the arm to the pin, stabilizing and/or reinforcing the pin in a simple manner and without an additional material. Forces which would otherwise lead to wear arise particularly at the transition from the arm to the pin.

For stabilization, the pin is, additionally or alternatively, preferably configured with at least one flange punched out of the reference plane of the punched and bent part and bent out of said reference plane. The flange is thus formed on at least one outer edge of the pin and, as a particularly preferred option, points radially in the direction of the arm. A particularly stable and simultaneously compact pin is thereby provided.

According to the disclosure, a valve in which the spring element is configured with an annular holding portion is furthermore advantageously provided. Here, the annular holding portion is formed by means of an annular disk, which is punched out of an abovementioned reference plane of the punched and bent part and in which, in particular, at least one through opening is punched. By means of the annular disk as an annular holding portion, the spring element can be mounted very simply in an accurately fitting manner and in a fixed location, in particular on the accumulator cylinder or accumulator piston of circular-cylindrical shape. Moreover, brake fluid can flow through the at least one through opening punched out of the annular disk. As a result, brake fluid can flow into the accumulator device and out of the accumulator device particularly easily and with particularly little resistance, and therefore the exchange of fluid is facilitated.

It is furthermore advantageous if the spring element is configured with at least one axial spacer facing the accumulator cylinder. In this case, the axial spacer is formed by means of a tab punched out of an above-described reference plane of the punched and bent part and bent out of said reference plane. This tab forms a spacing between the accumulator cylinder and the spring element, allowing fluid to flow through there. Moreover, the spacing avoids hydraulic sticking of the spring element on the accumulator cylinder, which would otherwise occur. In addition or as an alternative, an axial spacer facing the accumulator piston is preferably punched out of the reference plane of the punched and bent part and, from this reference plane, is formed as a bent-out tab. With the axial spacer formed in this way, a spacing is created between the spring element and the accumulator cylinder and preferably, at the same time, between the spring element and the accumulator piston. According to the disclosure, brake fluid can thus flow with particularly little resistance around the spring element.

The spring element is furthermore preferably configured with an axial protrusion facing the accumulator piston. The axial protrusion is formed by means of an arm punched out of an aforementioned reference plane of the punched and bent part and bent out of said reference plane. The protrusion of this kind forms a spacer between the accumulator piston and the opening means. This allows particularly simple adaptation of the arrangement according to the disclosure to different types of accumulator cylinder and/or accumulator piston. In particular, a simple, low-cost standard accumulator piston can be used, which has a flat piston end face. When the accumulator piston moves in the direction of the spring element, this piston end face is the first to press against the arm bent out of the reference plane of the punched and bent part and actuates the pin held in this way. In this way, a particularly short response time can be achieved.

The disclosure is furthermore directed to a use of such a valve according to the disclosure in an accumulator device, in particular for a hydraulic unit of a vehicle brake system, in which the accumulator piston, in particular, is configured with an axial protuberance facing the opening means. This configuration is particularly advantageous if the opening means is mounted with the spring element according to the disclosure on the accumulator cylinder or on the valve seat body.

The protuberance on the piston end face facing the opening means is preferably configured at least approximately in the form of a spherical segment. The center of the spherical segment is advantageously the point around which the accumulator piston can turn or pivot slightly within the accumulator cylinder when it deviates from its theoretically linear motion. The offset of this kind of the accumulator piston in the accumulator cylinder then to a large extent no longer has an effect on the actuation of the opening means.

BRIEF DESCRIPTION OF THE DRAWINGS

Illustrative embodiments of the solution according to the disclosure are explained in greater detail below by means of the attached schematic drawings, in which.

DETAILED DESCRIPTION

Figure 1:
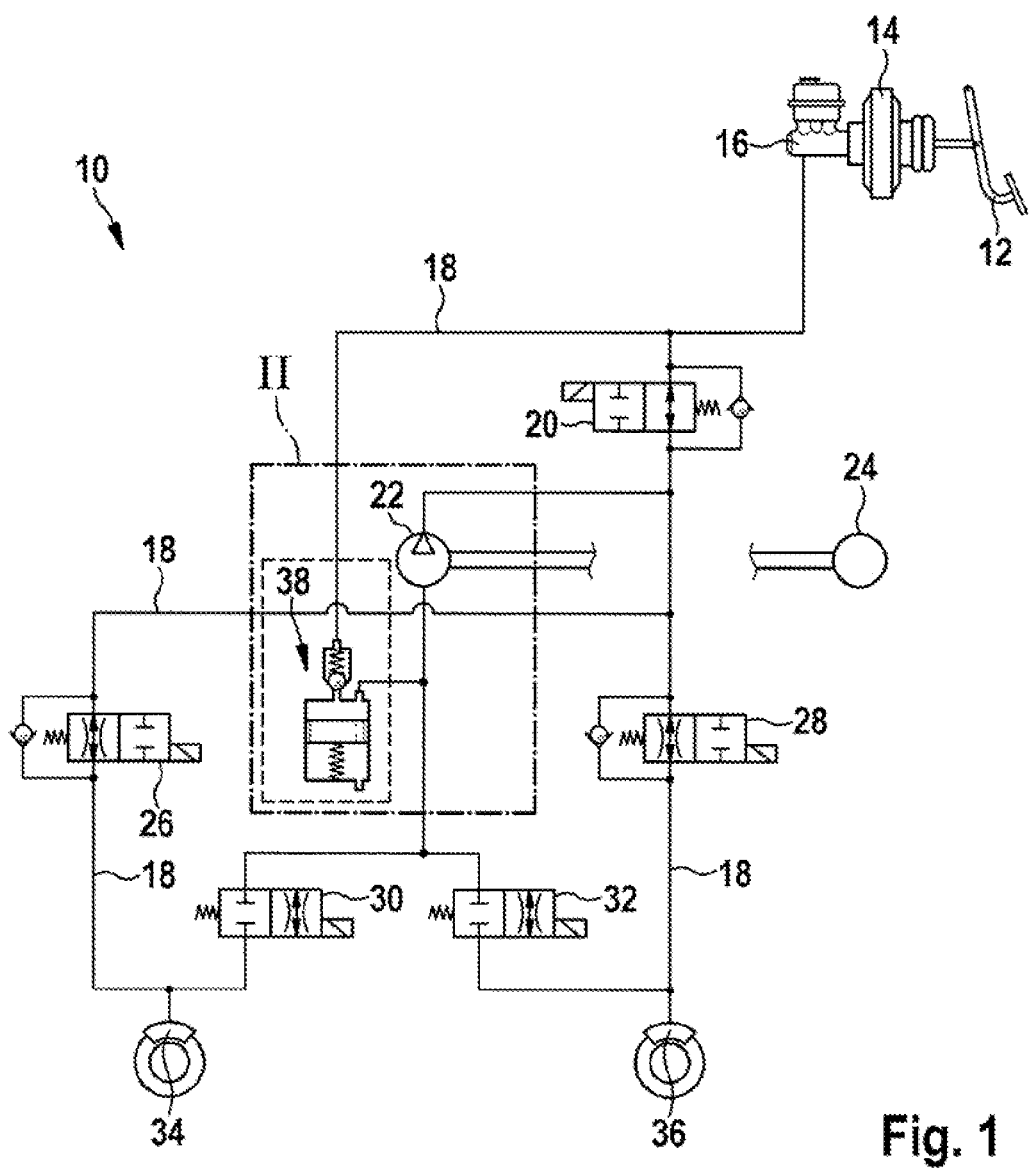
FIG. 1 shows part of a hydraulic circuit diagram of a vehicle brake system having an accumulator device in accordance with the prior art.

FIG. 1 illustrates a vehicle brake system 10, which comprises a brake pedal 12 that can be actuated by a driver of an associated four-wheeled vehicle. The brake pedal 12 acts on a brake booster 14, by means of which pressure on a fluid in the form of brake fluid can be produced at an associated brake master cylinder 16. The brake master cylinder 16 is connected to various fluid lines 18, by means of which, in particular, a changeover valve 20, a pump element 22 with associated drive motor 24, an inlet valve 26 for the rear left hand side, and inlet valve 28 for the front right hand side, an outlet valve 30 for the rear left hand side, an outlet valve 32 for the front right hand side, a brake cylinder 34 for the rear left hand side and a brake cylinder 36 for the front right hand side are selectively connected together fluidically. An accumulator device 38 for temporary storage of brake fluid is furthermore inserted into the fluid lines 18.

Figure 2:
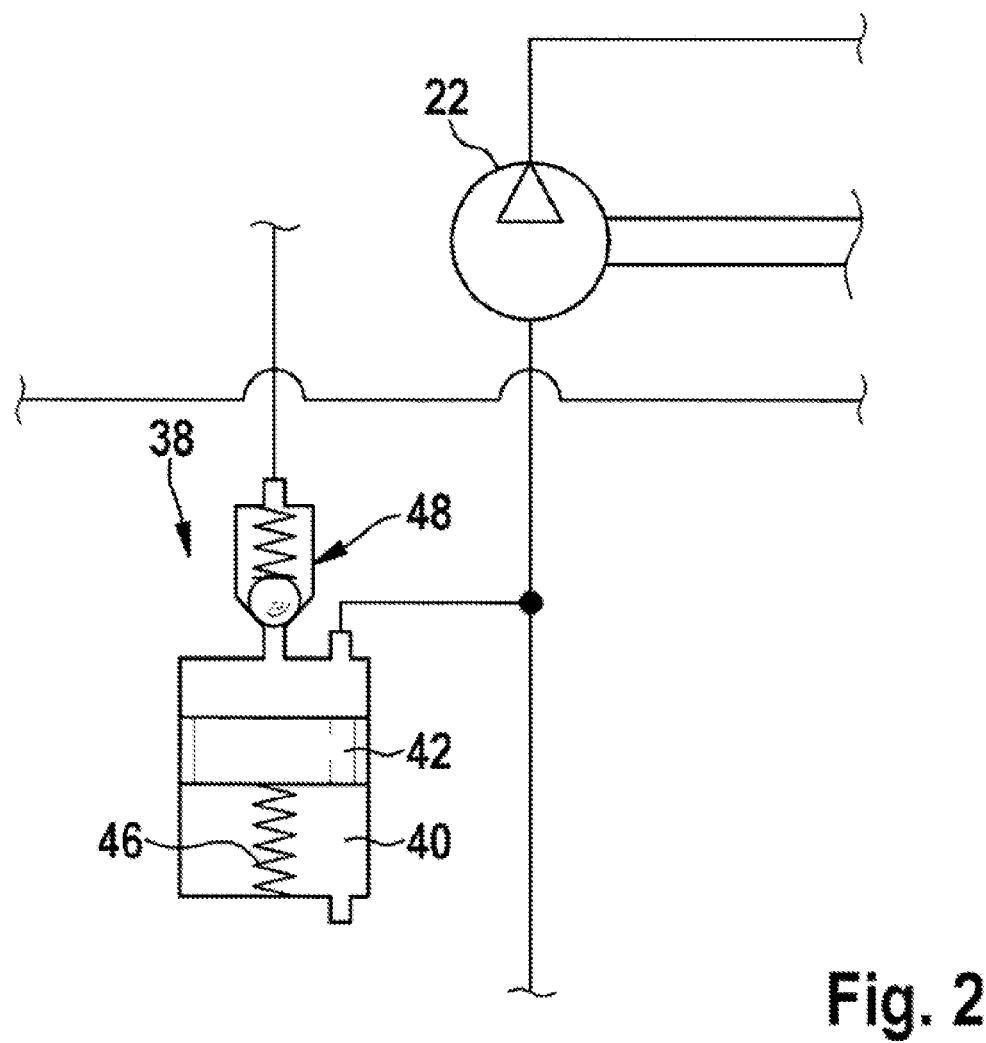
FIG. 2 shows the detail II in FIG. 1.
Figure 3:
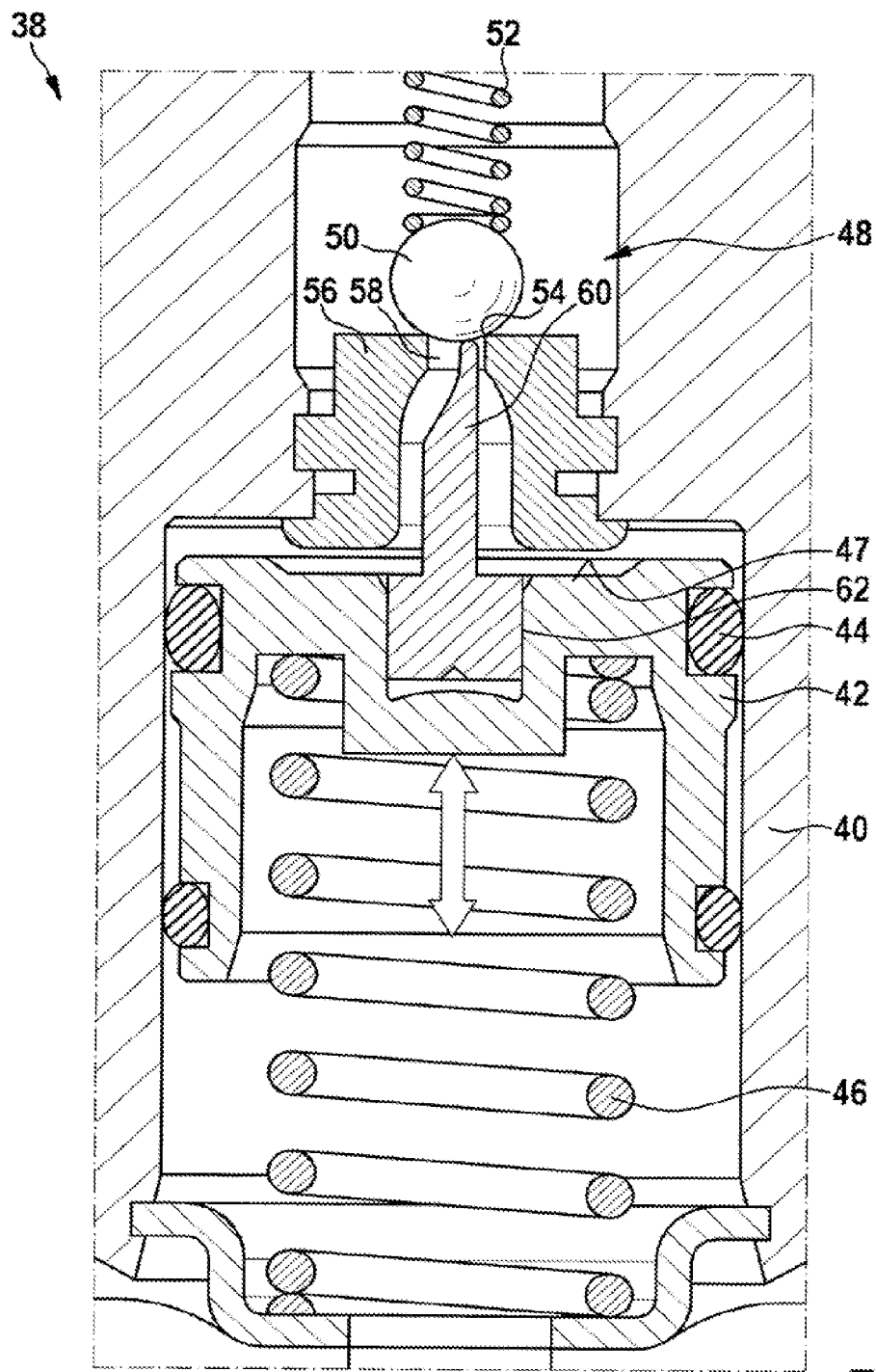
FIG. 3 shows a longitudinal section through an accumulator device in accordance with FIG. 1.

The accumulator device 38 is illustrated by a relatively rough schematic diagram in FIG. 2 and by a more detailed schematic diagram in FIG. 3. The accumulator device 38 comprises a cup-shaped, circular-cylindrical accumulator cylinder 40, in which an accumulator piston 42 is movably mounted. In this case, the accumulator piston 42 is sealed off in a fluid tight but, at the same time, movable manner on the inside of the accumulator cylinder 40 by means of a piston seal 44 arranged in a fixed location on the accumulator piston 42. A piston spring 46 urges the accumulator piston 42 mounted movably in this way into the cup shape of the accumulator cylinder 40, thereby forming in the interior of the latter a pressure space for the temporary storage of brake fluid under pressure.

A valve 48, by means of which brake fluid can be admitted selectively into the interior of the accumulator cylinder 40, is formed on the accumulator cylinder 40 at the bottom surface 47 of the cup shape of said cylinder, said bottom surface lying opposite the accumulator piston 42. The valve 48 is actuated by means of the accumulator piston 42 when the latter moves far into the accumulator cylinder 40 and thus approaches the valve 48. For this purpose, the valve 48 is configured with a valve sealing body 50 which is urged against a valve seat 54 in the direction of the accumulator piston 42 by means of a valve spring 52. The valve seat 54 is formed on a valve seat body 56 and there surrounds a valve opening 58. The valve seat body 56 can be of single-part configuration, of multi-part configuration with a valve seat and a valve seat carrier or integrated as a fastening in the accumulator cylinder 40.

An opening means 60 in the form of a pin is formed on the accumulator piston 42, said pin being pressed in an interference fit 62 on the accumulator piston 42 opposite the valve opening 58 and being held there in a fixed location. The interference fit 62 serves to position the pin-shaped opening means 60 very precisely, especially in the axial direction of the accumulator piston 42, relative to the valve sealing body 50 resting against the valve seat 54. Precise positioning is required to ensure that the accumulator piston 42 raises the valve sealing body 50 at a precisely defined point from the valve seat 54 and in this way opens the valve 48 as it moves into the accumulator piston 42.

Figure 4:
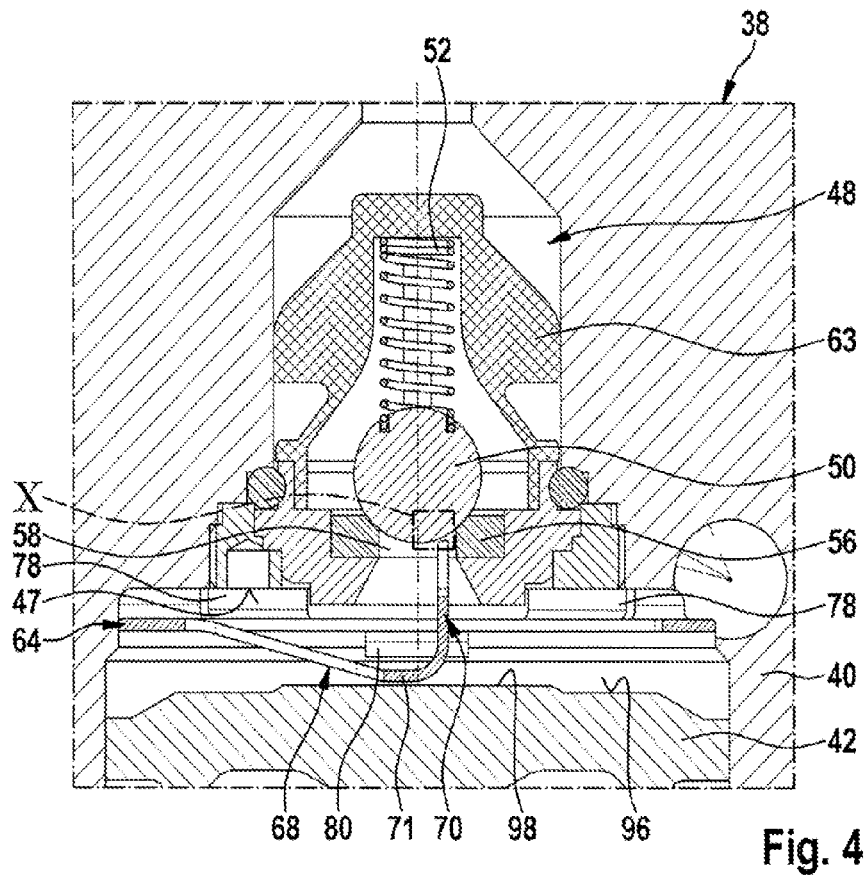
FIG. 4 shows a longitudinal section through a first variant of an accumulator device having a spring element according to the disclosure.
Figure 5:
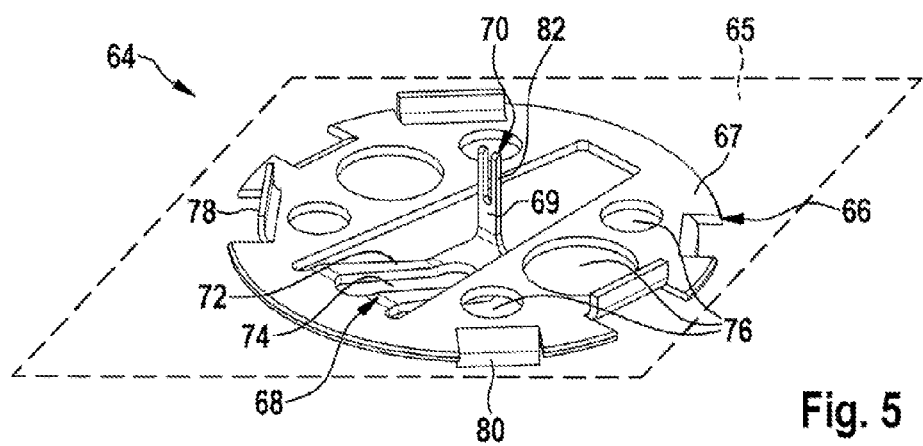
FIG. 5 shows a perspective view of a first illustrative embodiment of a spring element for a valve according to the disclosure.
Figure 6:
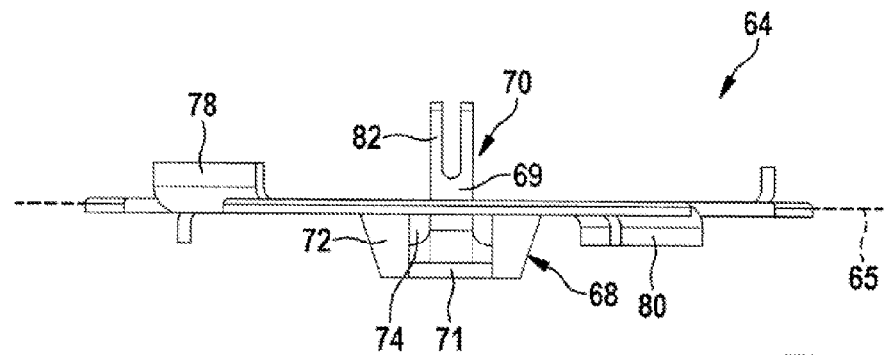
FIG. 6 shows a first side view of the spring element in accordance with FIG. 5.
Figure 7:
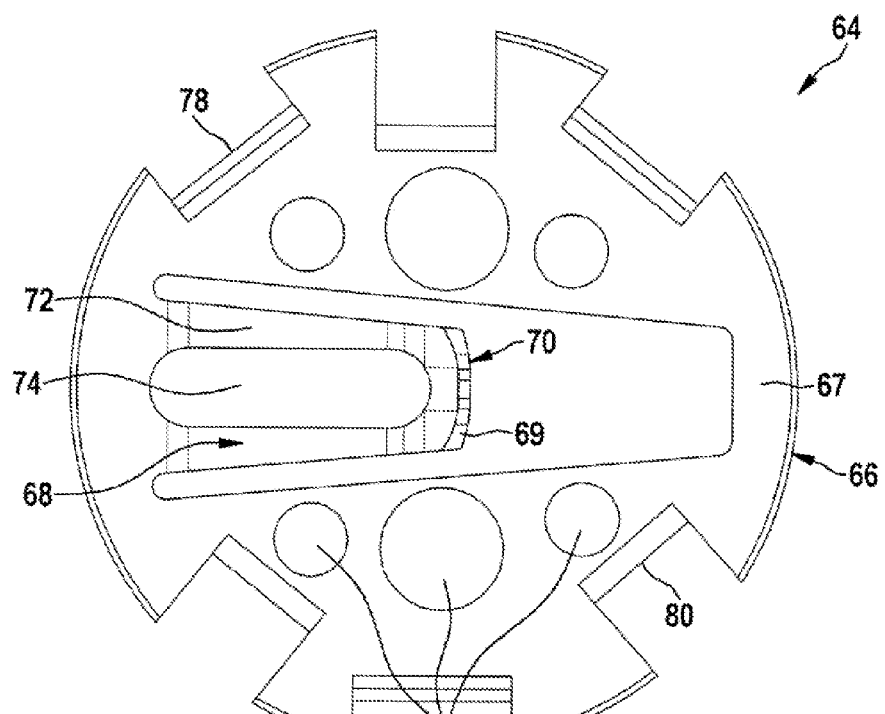
FIG. 7 shows a plan view of the spring element in accordance with FIG. 5.
Figure 8:
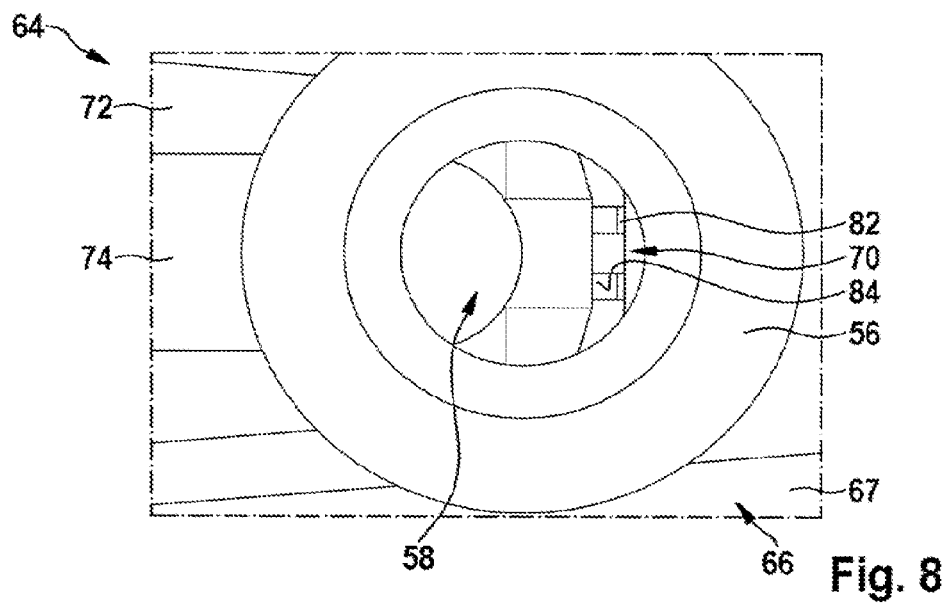
FIG. 8 shows an enlarged plan view of the spring element in accordance with FIG. 5.
Figure 9:
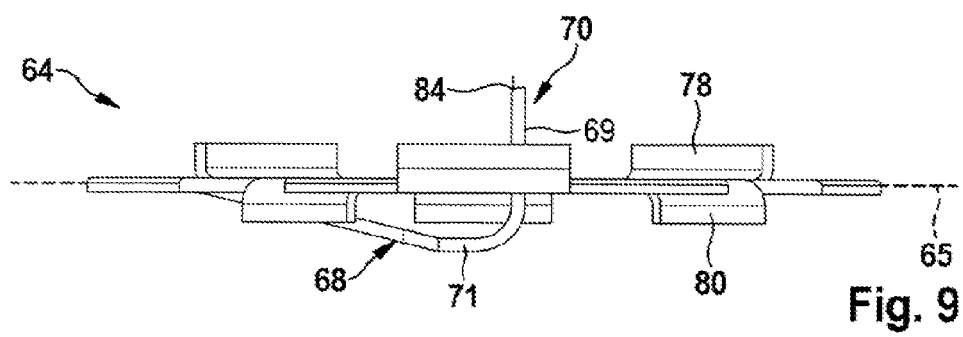
FIG. 9 shows a second side view of the spring element in accordance with FIG. 5.

FIG. 4 illustrates an accumulator device 38 according to the disclosure which very largely comprises the elements which have already been described in detail in FIG. 3. In addition, a filter 63 for filtering brake fluid flowing into the accumulator device 38 is fitted in the valve 48. Moreover, there is no conventional opening means 60 in the form of a pin arranged by means of an interference fit 62 in an accumulator piston 42 shaped especially for this purpose. Instead, a spring element 64 according to the disclosure is provided, in the present case said spring being positioned between the accumulator piston 42 and the bottom surface 47 of the accumulator piston 40.

FIG. 5 to FIG. 18 show various illustrative embodiments of the spring element 64 according to the disclosure in detail. Common to all the illustrative embodiments is the fact that the spring element 64 is formed as a punched and bent part, in the present case from spring steel, and has a reference plane 65. In this reference plane 65, an annular holding portion 66 of the spring element 64 is formed by punching an annular disk 67 out of the reference plane 65. The annular holding portion 66 serves to hold a radially directed arm 68 which, for its part, holds a pin 69. Both the arm 68 and the pin 69 are punched out of the reference plane 65 of the punched and bent part and are bent in such a way that the pin 69 points upward (relative to the figure). When installed in the accumulator device 38, the pin 69 projects in the direction of the accumulator cylinder 40 and hence in the direction of the valve sealing body 50. The pin 69 forms an opening means 70, by means of which the valve sealing body 50 is pushed off the valve seat 54 and hence the valve 48 is opened when the accumulator piston 42 moves into the accumulator cylinder 40 (FIG. 4 and FIG. 19).

Figure 19:
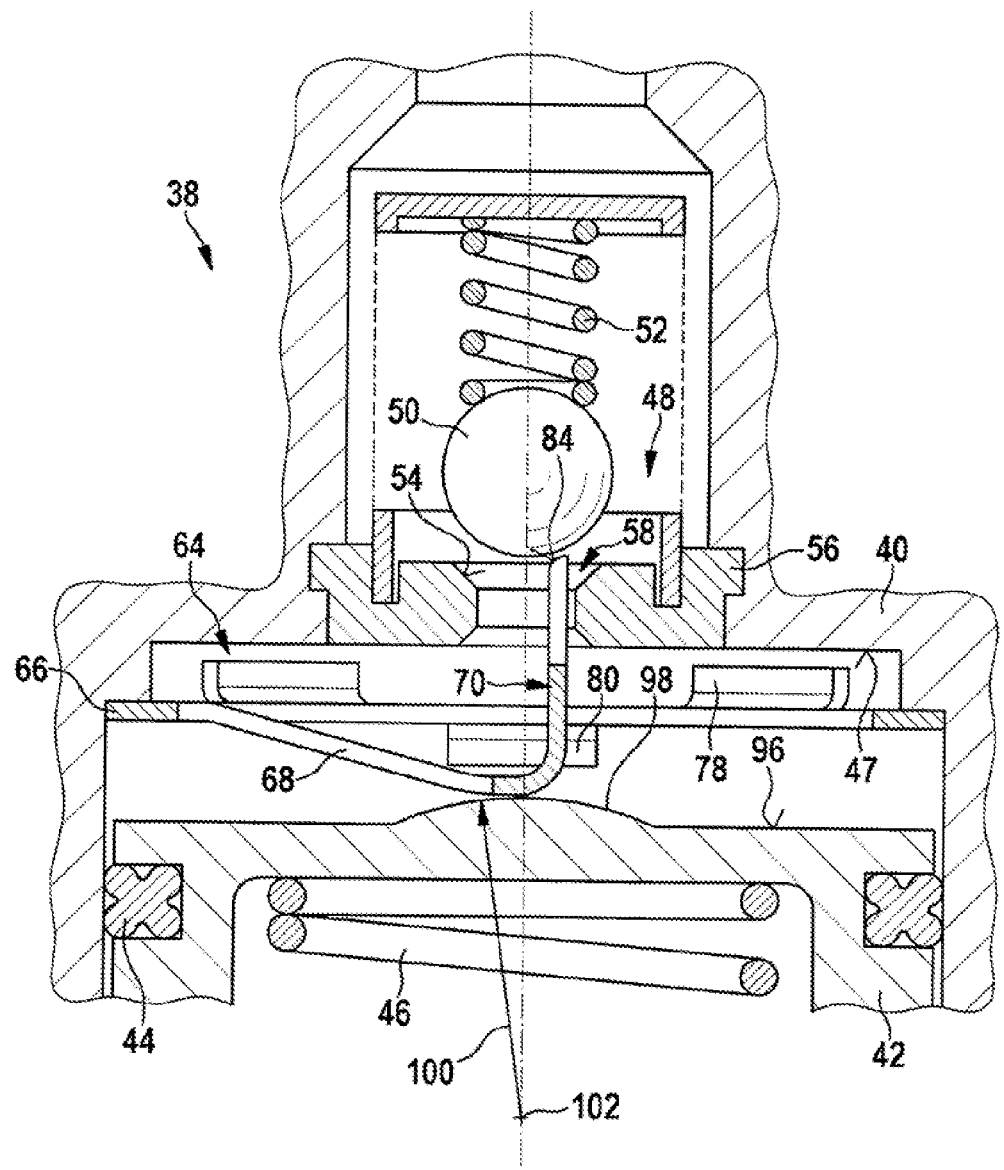
FIG. 19 shows a longitudinal section through a second variant of an accumulator device having a spring element according to the disclosure.

In its radially inward-directed extent, the arm 68 extends beyond the center of the annular disk 67, with the result that the pin 69 held by the arm 68 engages eccentrically on the valve sealing body 50 through the valve opening 58 (FIG. 4 and FIG. 19).

The arm 68 is furthermore bent in the direction of the accumulator piston 42, with the result that an axial protrusion 71 of the spring element 64 in the direction of the accumulator piston 42 is formed. If the accumulator piston 42 moves toward the spring element 64, the accumulator piston 42 touches the axial protrusion 71 first of all. The arm 68 and the pin 69 connected thereto are immediately pushed in the direction of the valve sealing body 50, and the valve 48 is opened particularly quickly.

Moreover, the arm 68 is configured with two parallel subarms 72, which are punched and bent out of the reference plane 65 and point radially inward approximately in parallel. A through opening 74 is formed between the subarms 72, attenuating the spring action of the spring element 64 and allowing the brake fluid to flow through.

The through flow of the brake fluid is additionally facilitated by means of at least one through opening 76, which is punched out of the annular disk 67. In the present illustrative embodiments, there are 5 to 6 such through openings 76.

In addition, a total of six tabs is punched out of the annular disk 67. Of the six tabs, three tabs are bent out of the reference plane 65 in such a way that three axial spacers 78 facing the bottom surface 47 of the accumulator cylinder 40 are formed. The other three tabs are bent in the opposite direction and thus form three axial spacers 80 facing the accumulator piston 42. By means of the spacing formed by the spacers 78 and 80, particularly easy and resistance-free through flow of the brake fluid is additionally enabled. Moreover, any hydraulic sticking of a conventional spring element or holder for an opening pin on the accumulator cylinder 40 and/or the accumulator piston 42, which would otherwise occur, is avoided.

Figure 10:
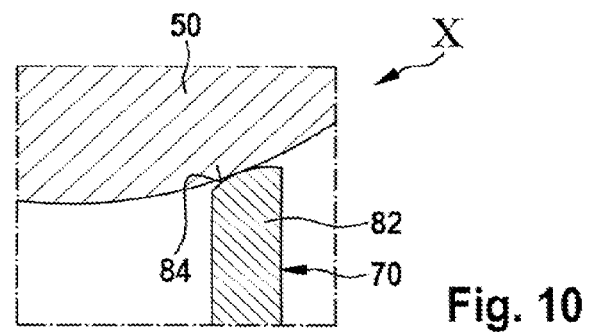
FIG. 10 shows the detail X in FIG. 4.

FIG. 5 to FIG. 10 illustrate a first illustrative embodiment of a spring element 64 according to the disclosure in detail in various views. In this case, the pin 69 has a bifurcated shape with two engagement rods 82. By means of these two engagement rods 82, the pin 69 engages reliably and without twisting on a ball serving as a valve closing body 50. The individual engagement rod 82 has an oblique, in particular rounded, contact surface 84, which touches the valve closing body 50 when the valve 48 is opened (FIG. 10).

Figure 11:
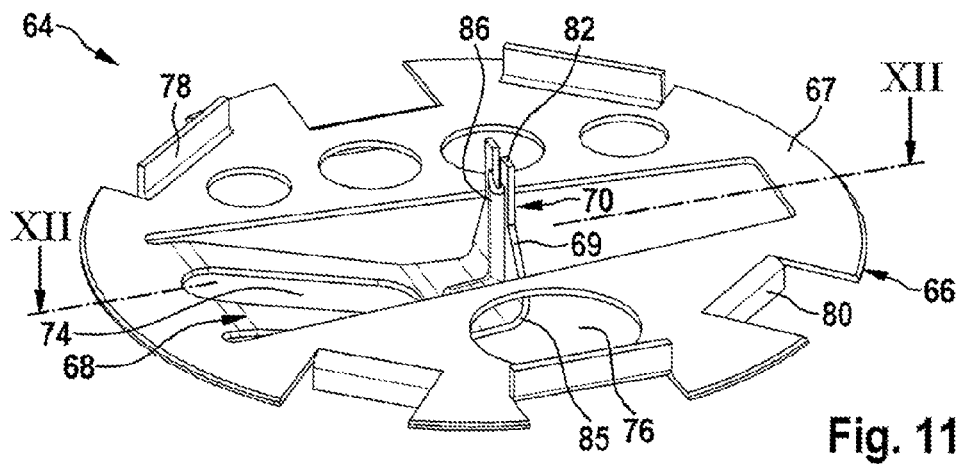
FIG. 11 shows a perspective view of a second illustrative embodiment of a spring element according to the disclosure.
Figure 12:
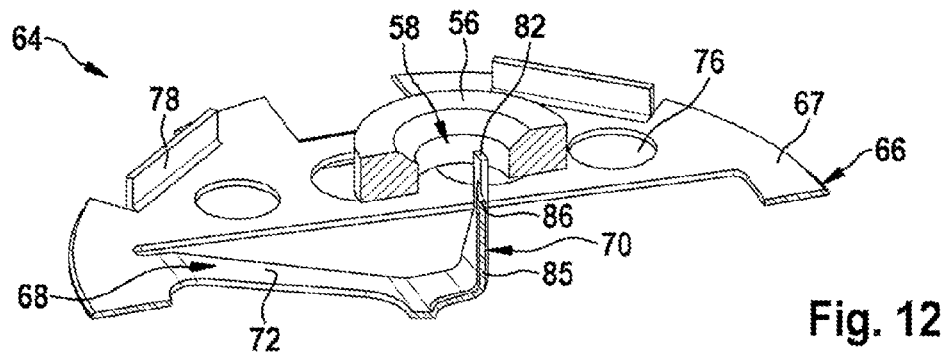
FIG. 12 shows the section XII according to FIG. 11.

FIG. 11 and FIG. 12 show an illustrative embodiment in which a bead 86 shaped convexly in the direction of the radial arm 68 is formed at a transition 85 from the arm 68 to the pin 69, i.e. at a pin bend, and between the two engagement rods 82. The bead 86 stabilizes the transition 85 and simultaneously stabilizes the pin 69.

Figure 13:
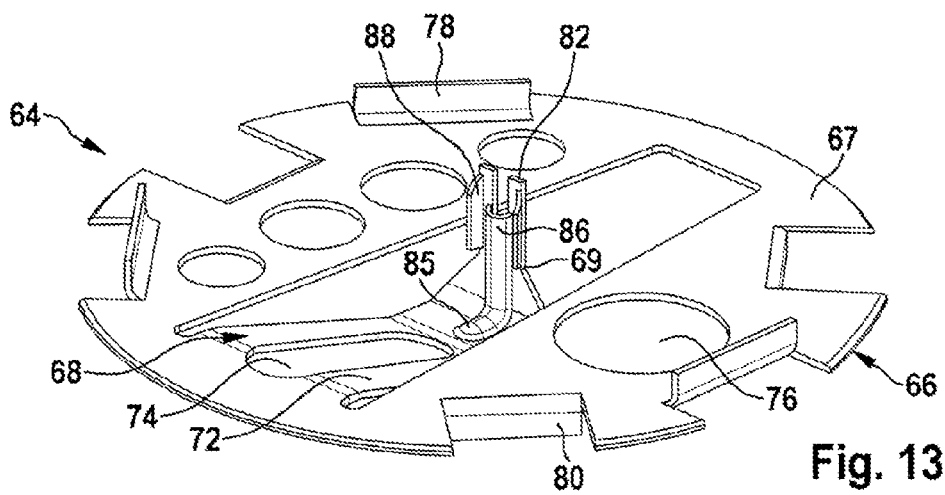
FIG. 13 shows a perspective view of a third illustrative embodiment of a spring element for a valve according to the disclosure.

In another illustrative embodiment in accordance with FIG. 13, the pin 69 is additionally stabilized by means of two flanges 88, which extend axially along respective outer edges of the pin 69 and point radially in the direction of the arm 68. In this way, a particularly stable and simultaneously compact pin 69 is advantageously formed.

Figure 14:
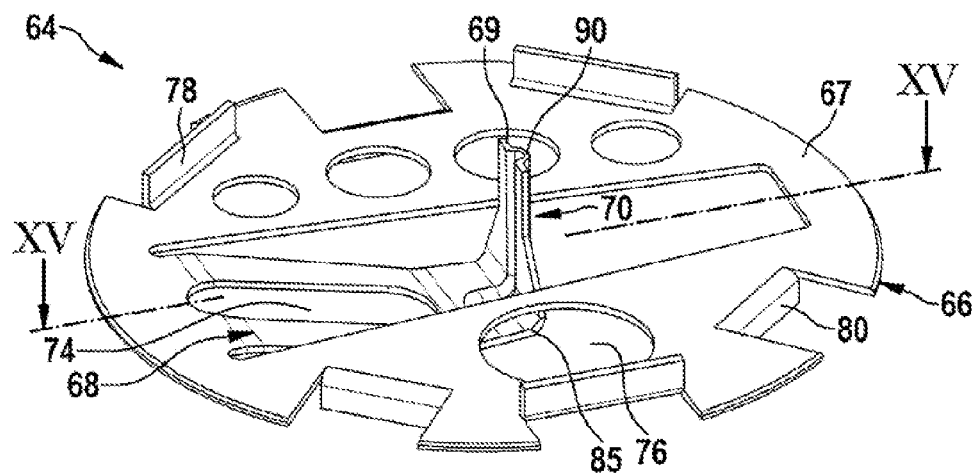
FIG. 14 shows a perspective view of a fourth illustrative embodiment of a spring element for a valve according to the disclosure.
Figure 15:
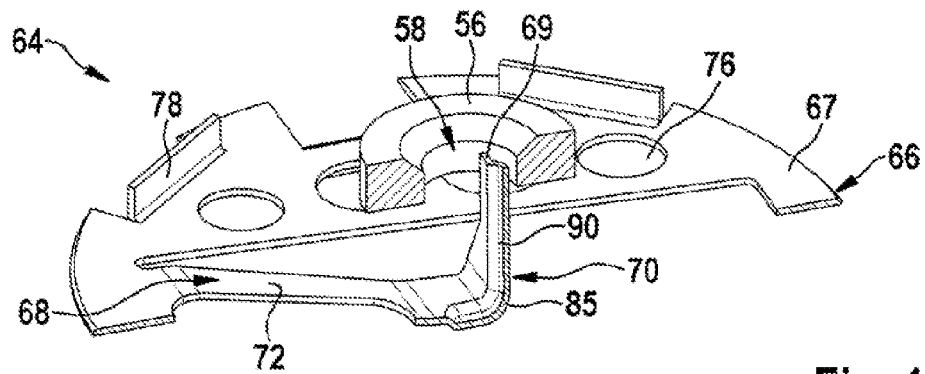
FIG. 15 shows the section XV according to FIG. 14.

FIG. 14 and FIG. 15 illustrate an illustrative embodiment in which a bead 90 which is concave when viewed in the direction of the radial arm 68 is formed at the transition 85. The concave bead 90 is thus situated on the outside of the pin bend, i.e. on a rounded portion of the pin 69 formed during the bending of that punched-out portion of the annular disk 67 provided for the arm 68 and the pin 69. By means of the concave bead 90, the pin 69 is, first of all, stabilized and, secondly, is shaped in such a way that two points of engagement for the sealing body 50 are created. There is no need here for two engagement rods 82 of the kind described in the illustrative embodiments shown in FIG. 5 to FIG. 13 to be specially formed.

Figure 16:
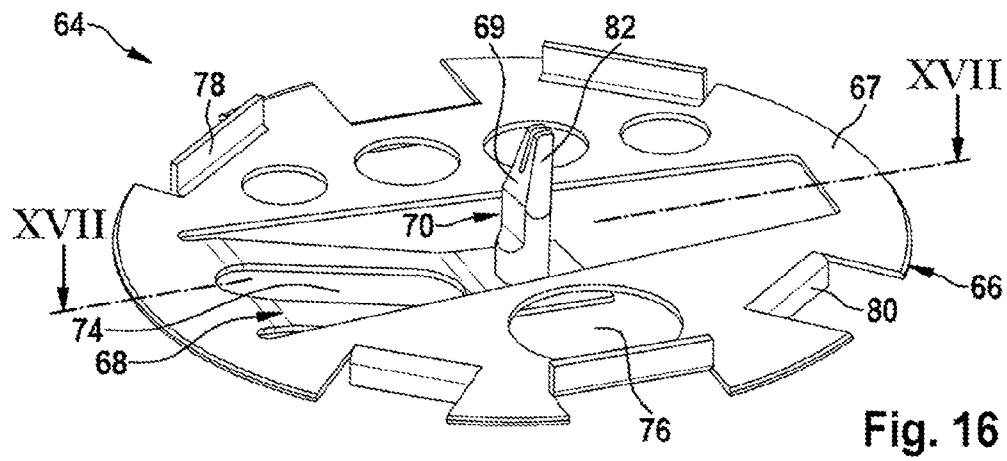
FIG. 16 shows a perspective view of a fifth illustrative embodiment of a spring element according to the disclosure.
Figure 17:
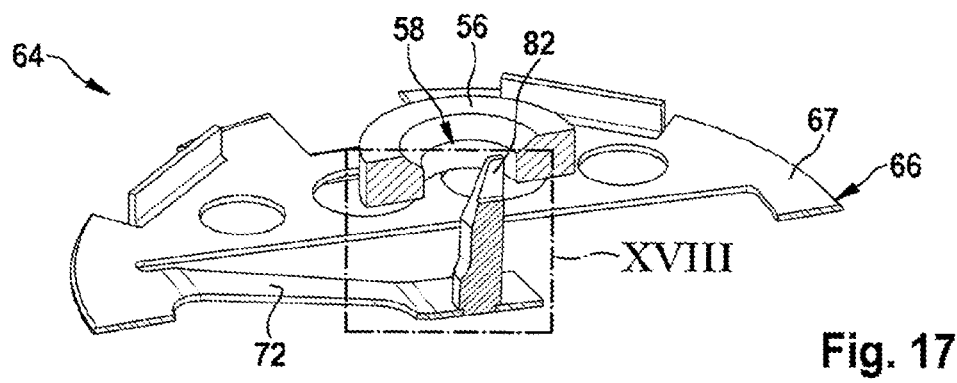
FIG. 17 shows the section XVII according to FIG. 16.
Figure 18:
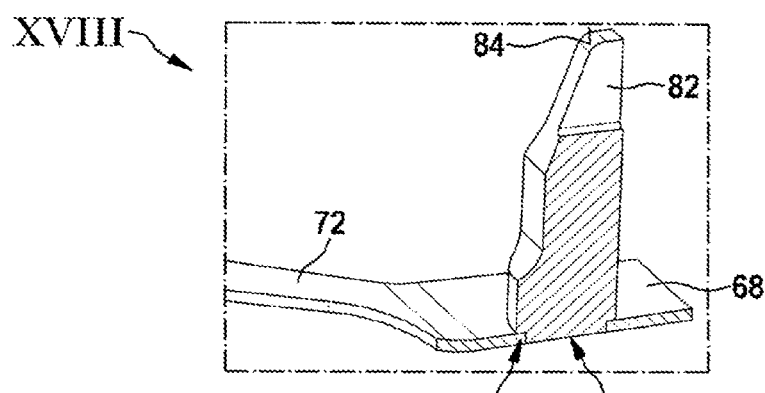
FIG. 18 shows the detail XVIII in FIG. 17.

In another illustrative embodiment in accordance with FIG. 16 to FIG. 18, the pin 69 is shaped as a separate pin with two engagement rods 82, each of which forms an oblique contact surface 84. This pin 69 furthermore has a shoulder formation 92, by means of which the pin 69 is pressed by means of an interference fit into a complementary aperture 94 provided in the punched and bent part. As an alternative, the pin 69 can be connected to the spring element 64 by means of soldering, welding and/or deformation of the pin.

As illustrated in FIGS. 4 and 19, the pin 69 projects through the associated valve opening 58 and ends with the, generally obliquely oriented, contact surface 84, which is provided for the purpose of striking against the associated valve sealing body 50. The positioning of the opening means 70 thus corresponds to that of the opening means 60 according to the prior art. At the same time, however, the opening means 70 is not arranged rigidly but is arranged resiliently on another body of the accumulator device 38. In this way, it can be arranged directly or indirectly on the accumulator cylinder 40, in particular resiliently, thereby making possible simple and, at the same time, precise positioning relative to the valve sealing body 50.

FIG. 4 shows an illustrative embodiment in which the spring element 64 is clipped onto the inside of the accumulator cylinder 40 by means of its holding portion 66 and, in this way, is mounted there in a fixed location.

In an alternative illustrative embodiment (not shown), the spring element 64 is held by means of its annular holding portion 66 on a correspondingly shaped valve seat body 56 and hence in the immediate vicinity of the valve seat 54.

The opening means 70 held resiliently on the accumulator cylinder 40 or on the valve seat body 56 in this way is moved against the valve sealing body 50 by means of the accumulator piston 42 in order to be able to raise said body from the valve seat 54 as already explained above. For this purpose, a protuberance 98, by means of which the accumulator piston 42 strikes against the spring element 64 during its movement into the accumulator cylinder 40, is formed centrally on a piston end face 96 facing the spring element 64. In the illustrative embodiment in accordance with FIG. 4, the protuberance 98 is in the form of an obliquely stepped elevation on a simple accumulator piston 42. In a variant illustrated in FIG. 19, the protuberance 98 is in the form of a spherical segment and has a radius 100 which is chosen in such a way that, when it pivots slightly or performs a nonlinear movement within the accumulator cylinder 40, the accumulator piston 42 pivots about the central point 102 at which the radius 100 has its origin. Irrespective of the nonlinear movement of the accumulator piston 42, the opening means 70 is thus always urged reliably toward the valve sealing body 50.

What is claimed is:

1. A valve of an accumulator device formed by an accumulator cylinder and an accumulator piston guided therein, the valve comprising:
    a valve sealing body configured to selectively open and close a valve opening at a valve seat defined by said accumulator cylinder; and
    an opening mechanism configured to selectively raise the valve sealing body from the valve seat,
    wherein the opening mechanism is held in the valve seat by a spring element,
    wherein the spring element includes a disk defining a reference plane within the plane of the disk and a radially directed arm punched from the disk and bent relative to the disk out of the reference plane, and
    wherein the spring element is fastened to the accumulator cylinder and arranged so that the radially directed arm can be contacted by movement of the accumulator piston toward the valve sealing body.

2. The valve according to claim 1, wherein the opening mechanism includes a pin element configured to engage the valve sealing body, the pin element formed by a pin punched out of a reference plane of the punched and bent part and bent out of said reference plane.

3. The valve according to claim 2, further comprising a bead formed at a transition from the radially directed arm to the pin.

4. The valve of claim 3, wherein the bead is a concave bead.

5. The valve of claim 3, wherein the bead is a convex bead.

6. The valve according to claim 2, wherein the pin includes at least one flange punched out of the disk and bent relative to said disk out of said reference plane.

7. The valve of claim 2, wherein the pin element is configured to slightly eccentrically engage the valve sealing body.

8. The valve according to claim 1, wherein the radially directed arm includes two subarms punched out of the disk and the reference plane and extending substantially radially.

9. The valve of claim 8, wherein the two subarms extend substantially radially in parallel.

10. The valve according to claim 1, wherein the spring element includes an annular holding portion formed by the disk.

11. The valve of claim 10, wherein the disk includes at least one through opening defined therein separate from the punched radially directed arm.

12. The valve according to claim 1, wherein the spring element includes at least one axial spacer configured to face the accumulator cylinder, the at least one axial spacer formed by a tab punched out of the disk and bent relative to said disk out of said reference plane.

13. The valve according to claim 1, wherein the spring element includes an axial protrusion configured to face the accumulator piston, the axial protrusion formed by an arm punched out of the disk and bent relative to said disk out of said reference plane.

14. The valve of claim 1, wherein said spring element is biased away from the direction of opening of the valve opening by the valve sealing body.

15. An accumulator device, comprising:
    an accumulator cylinder defining a valve opening having a valve seat;
    an accumulator piston configured to be guided within the accumulator cylinder; and
    a valve, including:
    a valve sealing body configured to selectively open and close the valve opening at the valve seat; and
    an opening mechanism configured to selectively raise the valve sealing body from the valve seat,
    wherein the opening mechanism is held in the valve seat by a spring element,
    wherein the spring element includes a disk defining a reference plane within the plane of the disk and a radially directed arm punched from the disk and bent relative to the disk out of the reference plane, and
    wherein the spring element is fastened to the accumulator cylinder and arranged so that the radially directed arm can be contacted by movement of the accumulator piston toward the valve sealing body.

16. The accumulator device of claim 15, wherein the accumulator device is configured for a hydraulic unit of a vehicle brake system.

17. The accumulator device of claim 16, wherein the accumulator piston includes an axial protuberance configured to face the opening mechanism and contact the radially directed arm.

* * * * *